United States Patent [19]

Chiba et al.

[11] 4,453,216

[45] Jun. 5, 1984

[54] ACCESS CONTROL SYSTEM FOR A CHANNEL BUFFER

[75] Inventors: Takashi Chiba; Satoru Koga, both of Kawasaki, Japan

[73] Assignee: Fujitsu Limited, Kawasaki, Japan

[21] Appl. No.: 388,195

[22] Filed: Jun. 14, 1982

[30] Foreign Application Priority Data

Jun. 15, 1981 [JP] Japan .................................. 56-91698
Jun. 19, 1981 [JP] Japan .................................. 56-95679

[51] Int. Cl.³ .............................................. G06F 13/00
[52] U.S. Cl. ............................................... 364/200
[58] Field of Search ............................. 364/200, 900

[56] References Cited

U.S. PATENT DOCUMENTS

| | | | |
|---|---|---|---|
| 3,670,307 | 6/1972 | Arnold et al. | 364/200 |
| 3,670,309 | 6/1972 | Amdahl et al. | 364/200 |
| 3,967,247 | 6/1976 | Anderson et al. | 364/200 |
| 4,168,541 | 9/1979 | DeKarske | 364/200 X |

*Primary Examiner*—Harvey E. Springborn
*Attorney, Agent, or Firm*—Staas & Halsey

[57] ABSTRACT

A computer system comprising a plurality of channels, at least one main storage unit, and a memory control unit having a channel buffer between the main storage unit and the channels. The channel buffer comprises a memory portion divided into a plurality of tag blocks, tag lines, and a data memory portion having a plurality of data lines each corresponding to one of the tag lines. Two tag lines forming a set and each set of the tag memory portion is assigned to one of the channels.

10 Claims, 9 Drawing Figures

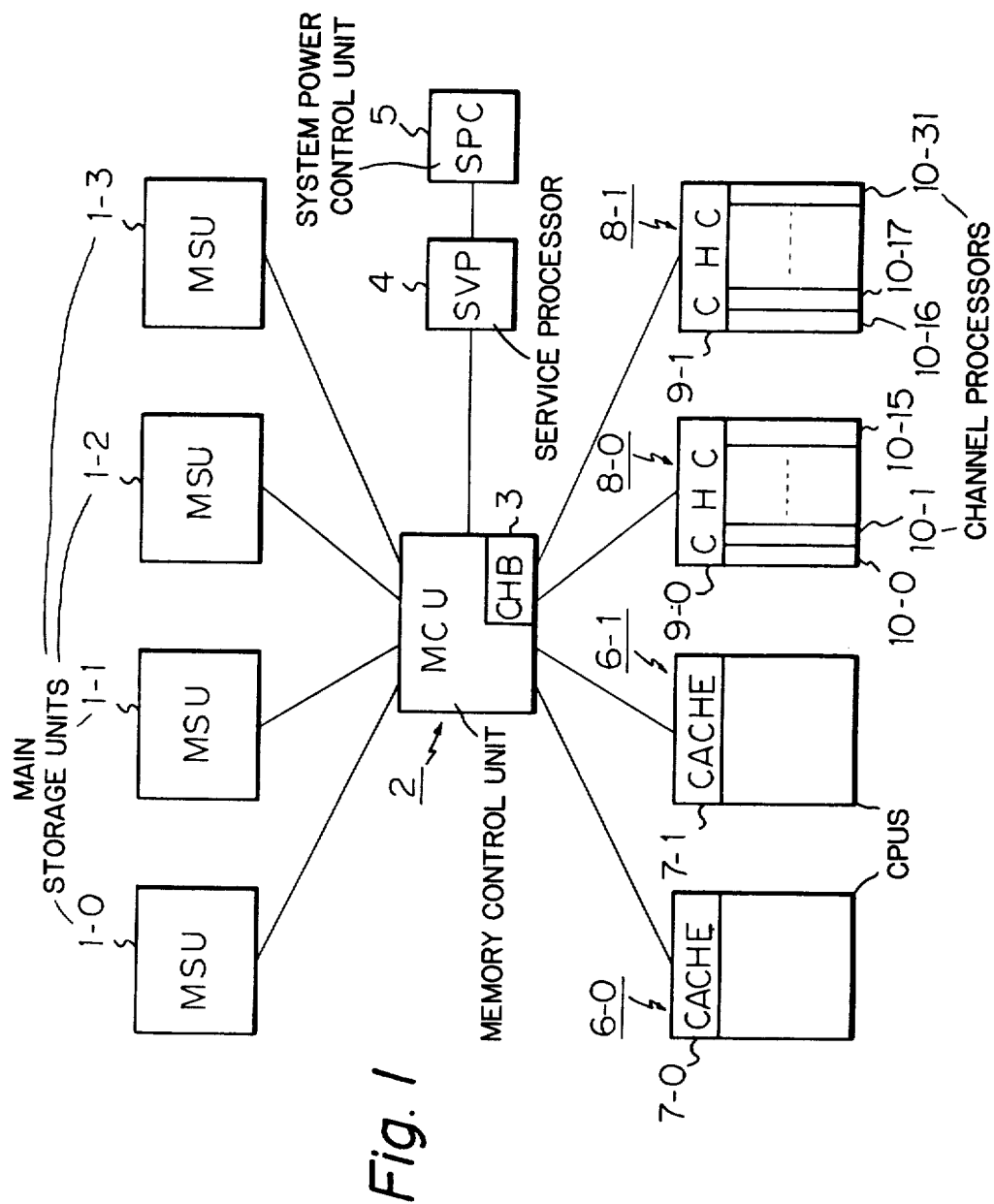
Fig. I

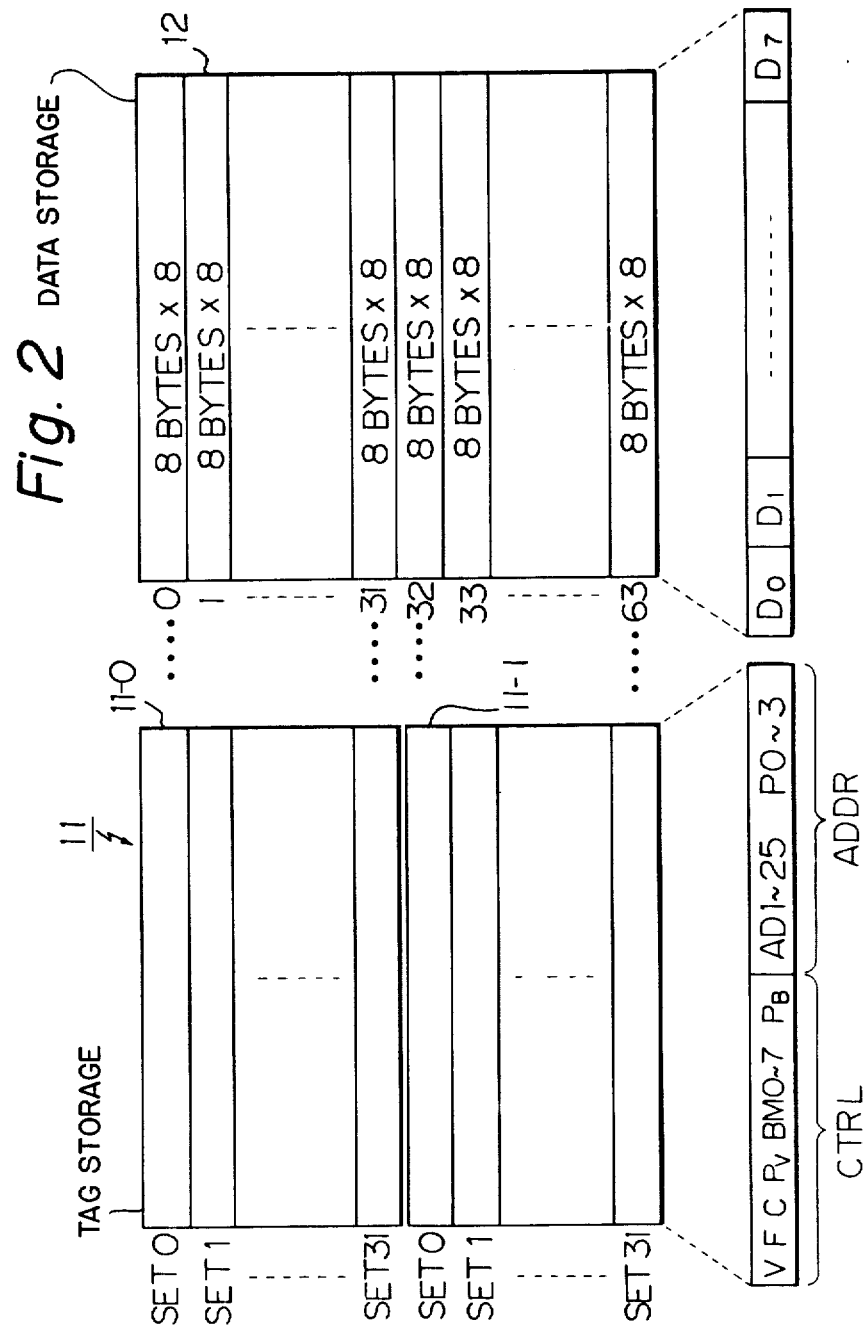
Fig. 2 DATA STORAGE

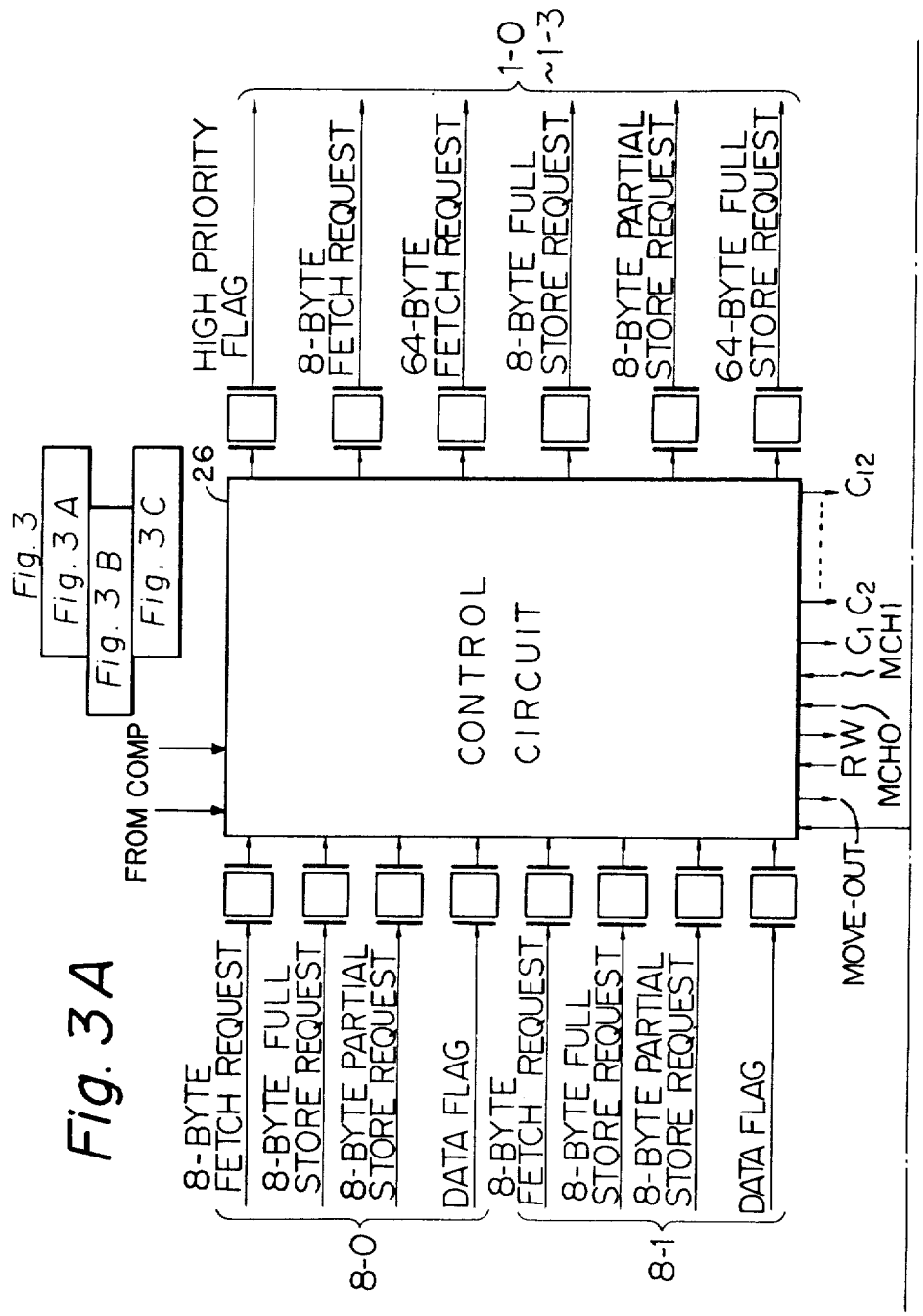

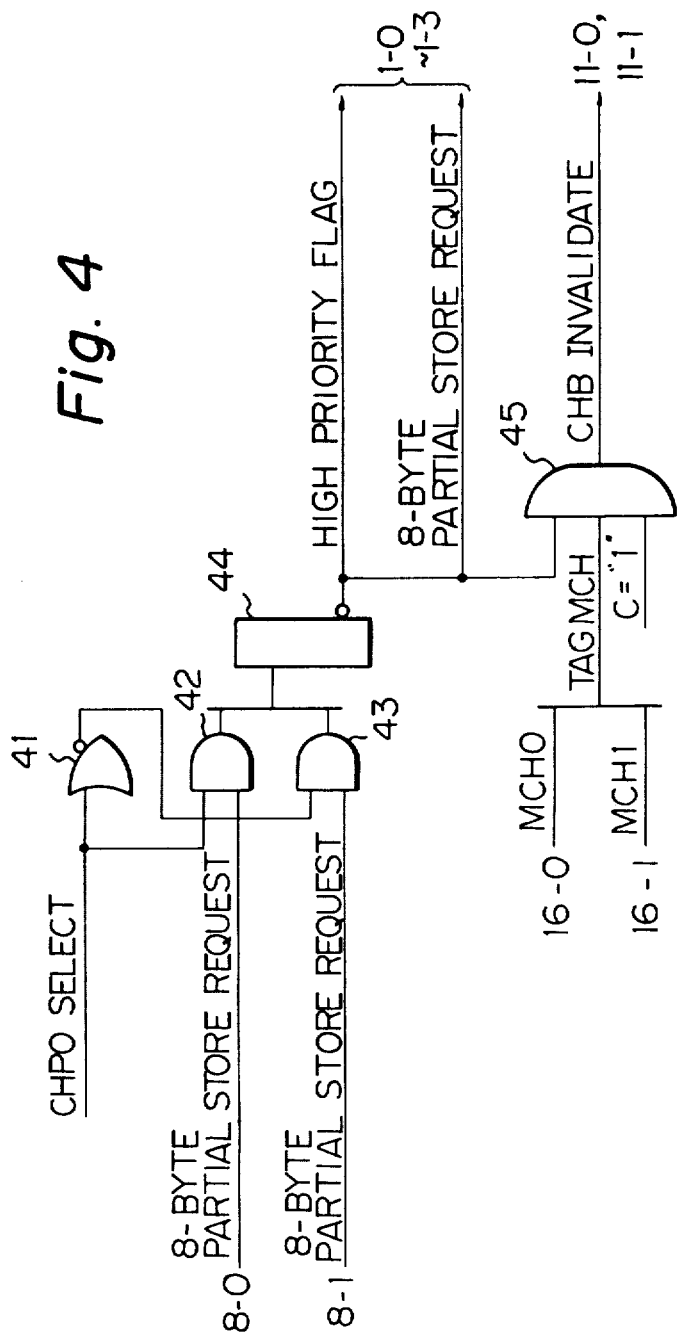

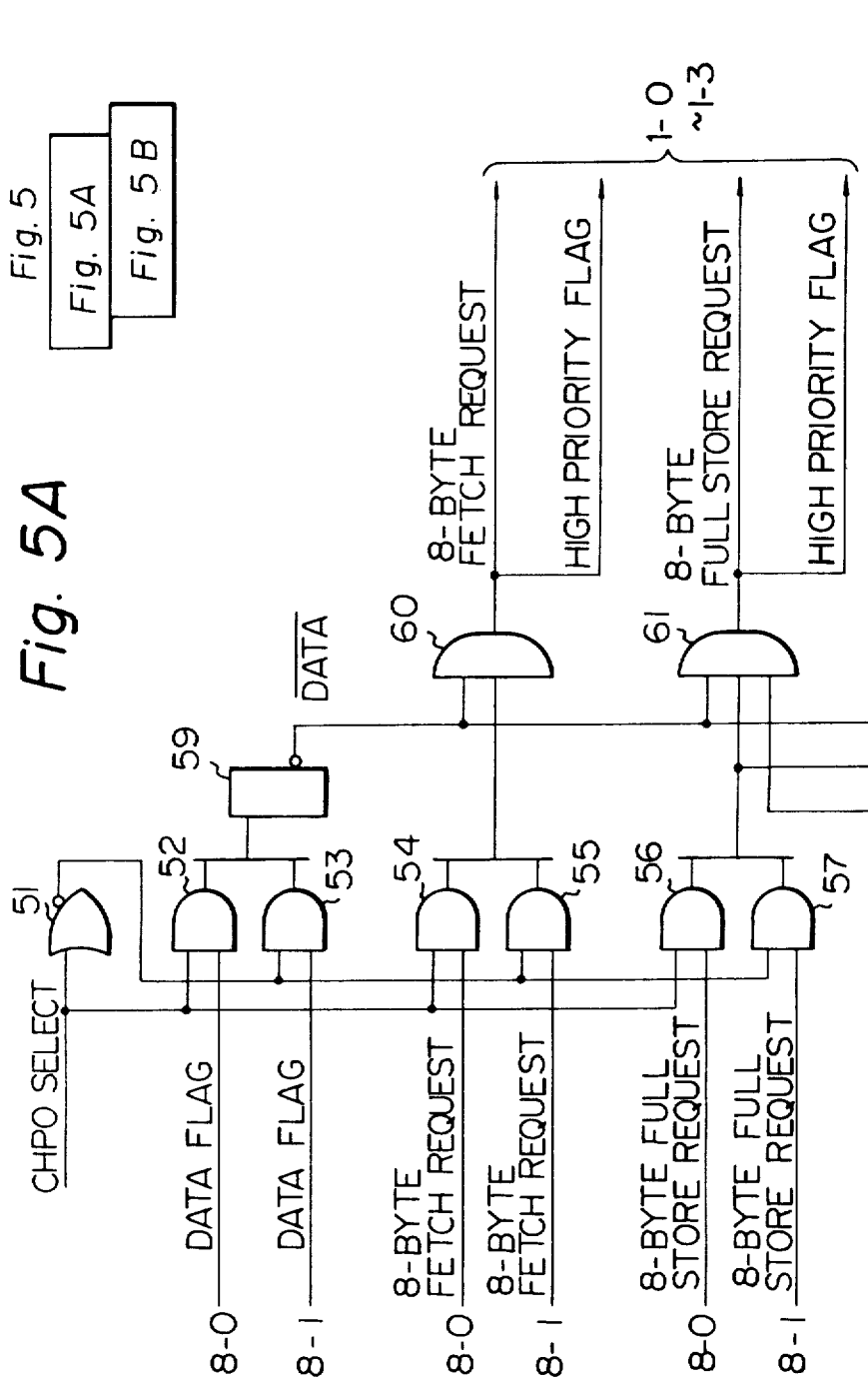

ACCESS CONTROL SYSTEM FOR A CHANNEL BUFFER

BACKGROUND OF THE INVENTION

1. Field of the Invention

The present invention relates to a computer system having hierarchical storage, more particularly, to a system for controlling access to a channel buffer in the computer system.

2. Description of the Prior Art

In general, a computer system comprises a main storage unit (MSU) for storing data and instructions, a central processing unit (CPU) for performing those instructions, a channel processor (CHP) including a plurality of channels, and a memory control unit (MCU) for controlling data transmission therebetween. In this computer system, in order to increase the throughput of access of the channels to the MSU and, in addition, in order to interrupt the access of the CPU to the MSU, a channel buffer (CHB) is provided in the MCU. The CHB is used for controlling data transmission between the CHP (or the channels) and the MSU. That is, when one of the channels requests a fetch, a predetermined amount of data including the fetch-requested data is transmitted from the MSU to the CHB, then the fetch-requested data is transmitted from the CHB to the channel. In this case, if the above-mentioned amount of data is already loaded in the CHB, the fetch-requested data therefrom is at once transmitted to the channel. On the other hand, if one of the channels requests a store access to the MSU, the data to be stored is temporarily stored in the CHB. After a predetermined amount of data is stored in the CHB, the predetermined amount of data is transmitted from the CHB to the MSU. As a result, the presence of the CHB reduces the probability of a main storage access being concurrently requested by the CPU and the CHP, thereby improving the throughput of the channels.

The CHP (channels) usually accesses continuous memory areas of the MSU, however, if a set associative system which is generally used for cache memories is adopted, the following problems occur:

(a) Since it is difficult to synchronize the access operation of the CHP as compared with the access operation of the CPU, access control becomes complex and, in addition, testing and troubleshooting are difficult.

(b) When the CHB is full of data, it is necessary to perform a "MOVE-OUT" operation prior to the actual access operation, which may invite channel overruns (command/data).

(c) A "RELEASE" operation is necessary. Note that a "RELEASE" operation is carried out to bring all of the contents of the CHB to the MSU when an input-/output instruction is initiated and when an interruption is generated at the end of data transmission.

(d) When the CPU requests a store access to the MSU, it is necessary to search whether or not the block requested by the CPU is also present in the CHB. If the block is also present in the CHB, it is necessary to invalidate that block.

(e) The store sequence from the CHP to the MSU is not clear to the CPU. Therefore, if the CPU desires a correct store sequence, it is necessary to carry out additional input/output instructions without data transmission.

SUMMARY OF THE INVENTION

It is, therefore, an object of the present invention to provide a computer system having a channel buffer in which channel buffer access control is simple.

It is another object of the present invention to provide a computer system having a channel buffer in which channel overruns are reduced.

It is still another object of the present invention to provide a computer system having a channel buffer in which no "RELEASE" operation is necessary.

It is a further object of the present invention to provide a computer system having a channel buffer in which, during a store operation by a CPU, no search of the channel buffer is necessary.

It is a still further object of the present invention to provide a computer system having a channel buffer in which the sequence of store from a CHP to an MSU can be clear to the CPU.

According to the present invention there is provided a computer system comprising: a plurality of channels; at least one central processing unit; at least one main storage unit; a memory control unit connected to the channels, to the central processing unit and to the main storage unit, for controlling data transmission between the channels, the central processing unit and the main storage unit; a channel buffer, included in the memory control unit, for controlling the main storage unit and the channels; a tag memory portion, included in the channel buffer and divided into a plurality of sets of blocks of tag lines for storing control information and address information including a main storage unit block address of a block of the main storage unit, each set of the tag memory portions being designated for one of the channels; a data portion, included in the channel buffer and divided into a plurality of data lines each corresponding to one of the tag lines; first access device for accessing said tag portion so as to select one tag line of each block of the tag portion; second access device for accessing the data portion so as to select one data line thereof; third access device for accessing the main storage unit; a comparator, connected to the tag portion, for comparing the main storage unit block address stored in each tag line selected by the first access device with an access address from the channels to the main storage unit, so as to generate a matching signal when both addresses match; whereby access to the data portion is carried out by the second access device when one of the matching signals is generated, while access to the main storage unit is carried out by the third access device when none of the matching signals are generated.

The present invention will be more clearly understood from the following description and with reference to the accompanying drawings.

BRIEF DESCRIPTION OF THE DRAWINGS

FIG. 1 is a block diagram illustrating an embodiment of the computer system according to the present invention;

FIG. 2 is a block diagram of the memory areas of the channel buffer 3;

FIG. 3, comprising FIGS. 3A-3C is a detailed block diagram of the channel buffer 3 of FIG. 1;

FIG. 4 is a partial logic circuit diagram of the control circuit 26 of FIG. 3, for explaining the operation regarding 8-byte partial store request;

DESCRIPTION OF THE PREFERRED EMBODIMENT

Figure 3B:
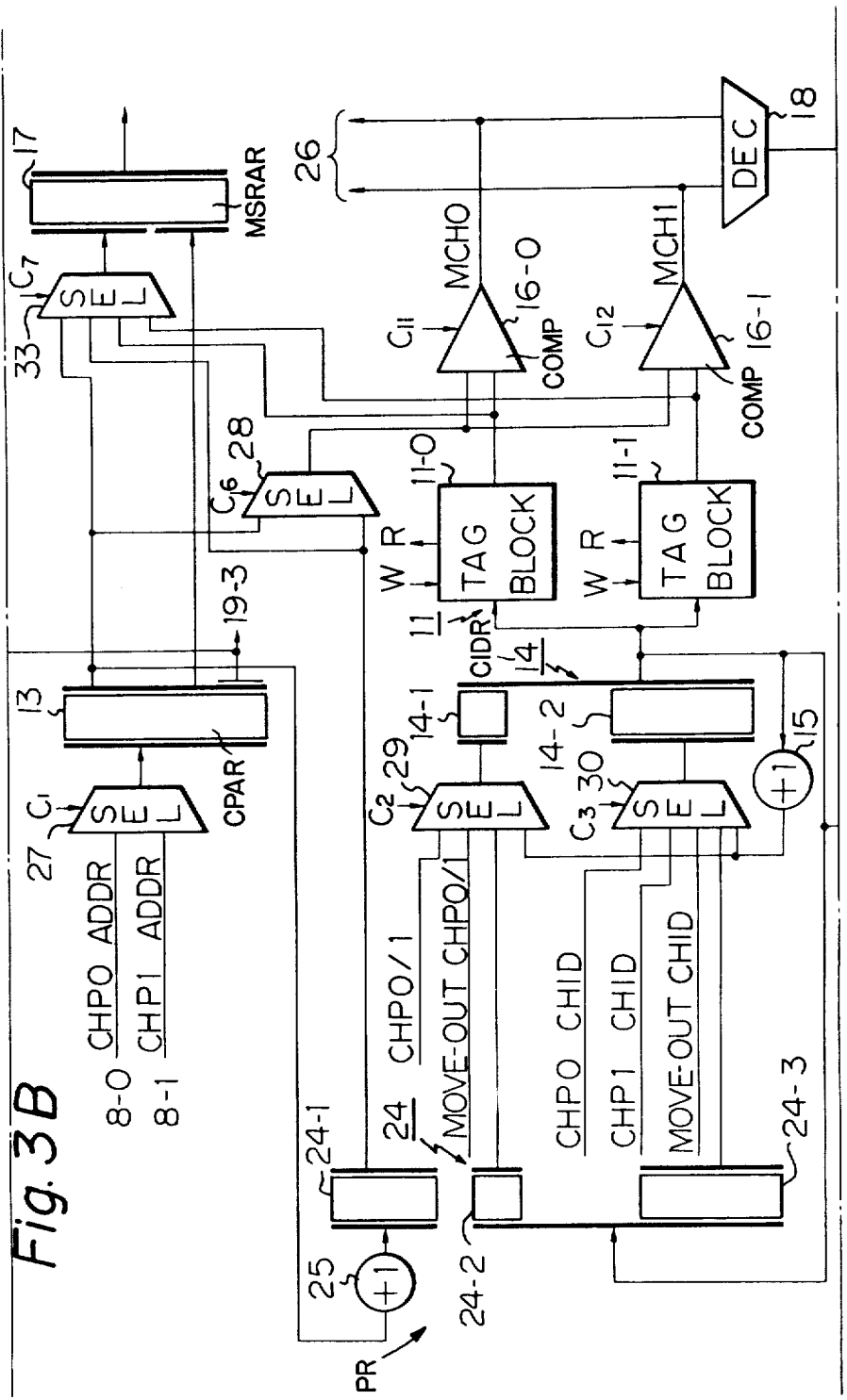

In FIG. 1, which illustrates an embodiment of the computer system according to the present invention, reference numerals 1-0 through 1-3 can be MSU's which are, for example, interleaved four ways (not shown); 2 is an MCU; 3 is a CHB; 4 is a service processor (SVP); 5 is a system power control unit (SPC); 6-0 and 6-1 are CPU's; 7-0 and 7-1 are cache memories in the CPU's ; 8-0 and 8-1 are CHP's; 9-0 and 9-1 are channel control units (CHC's); and 10-0 through 10-31 are channels. An example of a central processing unit with a cache memory can be found in U.S. Pat. No. 3,217,298.

MCU 2 is used for controlling data transmission between MSU's 1-0 through 1-3 and CPU's 6-0 and 6-1 (or cache memories 7-0 and 7-1) or CHC's 9-0 and 9-1. An example of a memory control unit and main storage unit can be found in U.S. Pat. No. 3,670,309 to Amdahl et al or U.S. Pat. No. 3,670,307 to Arnold et al. MCU 2 includes the CHB 3, which has a tag memory portion and a data memory portion in the same way as a conventional cache memory. For an example of a conventional cache memory having a tag portion (19) and a data portion (20), see U.S. Pat. No. 3,670,307 to Arnold et al.

SVP 4, which is a subsystem independent of CPU's 6-0 and 6-1, has a hardware console function, an operator console function, a maintenance and diagnosis function, and so forth. An example of a service processor can be found in U.S. Pat. No. 4,149,244 to Anderson et al.

SPC 5 performs power-on and power-off control with respect to the entire system and monitors the power.

CPU's 6-0 and 6-1 each have cache memories 7-0 and 7-1, respectively, which operate at a high speed.

CHP's 8-0 and 8-1 have CHC's 9-0 and 9-1, respectively, and 16 channels 10-0 through 10-15 and 10-16 through 10-31, respectively. That is, a total of 32 channels are provided in this system.

Usually, the width of the data bus between MCU 2 and each of CHP's 8-0 and 8-1 is 8 bytes, as is the width of the data bus between MCU 2 and each of MSU's 1-0 through 1-3. In this system, when CHP 8-0 or 8-1 sends an 8-byte data fetch request to MCU 2, the tag portion of CHB 3 is searched. If the corresponding fetch request address is present in the tag memory portion of CHB 3, the corresponding 8-byte data is read from the data memory portion of CHB 3 to CHP 8-0 or 8-1, which sends the request. On the other hand, if the corresponding fetch request address is not present in the tag memory portion of CHB 3, 64-byte unit of data including the corresponding 8-byte data is transmitted from MSU's 1-0 through 1-3 to the data memory portion of CHB 3, and, after that, only the corresponding 8-byte data is transmitted from the data portion of CHB 3 to CHP 8-0 or 8-1.

In addition, when CHP 8-0 or 8-1 sends a store request to MCU 2, data to be stored is written into the data portion of CHB 3. After that, when a predetermined amount of data to be stored, for example, 64-byte of storable data, is stored in the tag portion of CHB 3, this 64-byte data is written into MSU's 1-0 through 1-3.

In FIG. 2, which illustrates CHB 3 of FIG. 1, reference numeral 11 is a tag memory portion of CHB 3, which has two tag blocks 11-0 and 11-1. Each of tag blocks 11-0 and 11-1 is divided into 32 tag lines, each tag line being divided into a control information area CTRL and an address information area ADDR. A tag line from each tag block comprises a tag line set and each tag line set is assigned to a different channel. In the area CTRL, there are written a valid flag V, a first-in first-out flag F, a change flag C, a parity bit $P_V$ for the flags V, F, and C, byte marks BM0 through BM7, and a parity bit $P_B$ for the byte marks. In the area ADDR, there are written main storage address bits 1 through 25 and parity bits P0 through P3.

In FIG. 2, reference 12 is a data portion of CHB 3 divided into 64 data lines, each data line having eight 8-byte data areas. That is, each data line has a 64-byte data area. The i-th tag line of tag block 11-0 corresponds to the i-th data line of data portion 12, while the i-th tag line of tag block 11-1 corresponds to the (32+i)-th data line of data portion 12.

According to the present invention, two data lines are allocated for each channel for a total of 128 bytes allocated per channel. For example, the 0-th data line and the 32-th data line of the data portion 12 are allocated to channel 10-0 of CHP 8-0, while the 16-th data line and the 48-th data line of the data portion 12 are allocated to channel 10-16 of CHP 8-1.

The valid flag V of a tag line indicates whether or not the data of the corresponding data line is valid. For example, if the valid flag V is the logic "1", the data is valid, while if the valid flag V is the logic "0", the data is invalid. The first-in first-out flag F of a tag line indicates which data stored in the two data lines allocated to one channel is newer. For example, if the first-in first-out flag F of the 0-th tag line of tag block 11-0 is the logic "1" and the first-in first-out flag F of the 0-th tag line of tag block 11-1 is the logic "0", the data of the 0-th data line of data portion 12 is newly registered as compared with the data of the 32-th data line of data portion 12. Note that, when the first-in first-out flag F is changed from the logic "1" to the logic "0", the corresponding data line can be connected to a "MOVE-OUT" queue so as to move out the content of this data line to MSU's 1-0 through 1-3. The change flag C of a tag line indicates whether data to be stored is written from CHP 8-0 or 8-1 into the corresponding data line that is, whether the data in the data line has been changed. If the change flag C of a tag line is the logic "1", the data to be stored is written from CHP 8-0 or 8-1 into the corresponding data line. If the change flag C of a tag line is the logic "0", no data to be stored is present in the corresponding data line. Each of byte marks BM0 through BM7 corresponds to eight 8-byte areas $D_0$, $D_1$, ..., $D_7$ of a 64-byte data line. For example, if the i-th bit of the byte marks is the logic "1", to be stored data is written in the area $D_i$ of the corresponding data line. In this case, the change bit C of a tag line represents an OR logic of the byte marks of the same tag line.

It should be noted that one byte mark of a tag line indicates whether or not 8-byte store data to be stored (8-byte full store data) is written into the 8-byte area such as $D_0$ of the corresponding data line. In other words, 4-byte store data (8-byte partial store data) cannot be written into the 8-byte area of the corresponding data line. In this case, the 8-byte partial store data is directly transmitted to MSU's 1-0 through 1-3, and not through data portion 12.

Figure 3C:
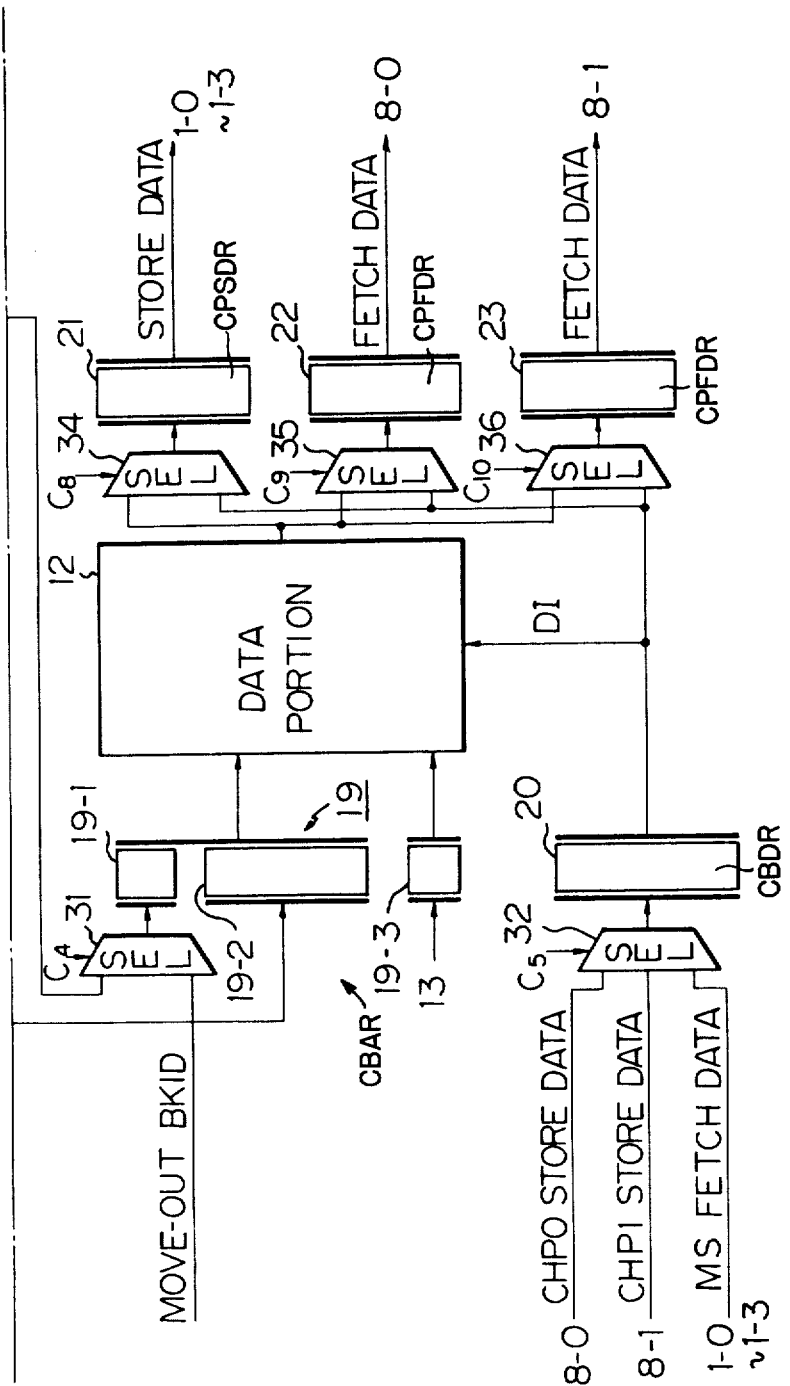

FIG. 3, comprising FIGS. 3A-3C, is a detailed block diagram of CHB 3 of FIG. 1. In FIG. 3B, reference numeral 13 is a CHP address register (CPAR); 14 is a channel identification register (CIDR) comprised of an upper register 14-1 (which is, in this case, 1 bit) and a lower register 14-2 (which is, in this case, 4 bits); 15 is a +1 circuit; 16-0 and 16-1 are comparators; (COMP) 17 is a main storage request address register MSRAR; and 18 is a decoder. In FIG. 3C, 19 is a CHB address register (CBAR) comprised of a first partial register 19-1 (which is, in this case, 1 bit), a second partial register 19-2 (which is, in this case, 5 bits), and a third partial register (in-line register) 19-3 (which is, in this case, 3 bits); 20 is a CHB data register (CBDR); 21 is a CHP store data register (CPSDR); 22 and 23 are CHP fetch data registers (CPFDR); 24 is a prefetch register (PR) comprised of first, second, and third partial registers 24-1, 24-2, and 24-3; 25 is a +1 circuit. In FIG. 3A, 26 is a control circuit; and 27 through 36 in FIGS. 3B and 3C are selectors controlled by control circuit 26.

A main storage access address CHP0 ADDR or CHP1 ADDR is sent from CHP 8-0 or 8-1 to CHP address register 13 (FIG. 3B). Control information such as an 8-byte fetch request, an 8-byte full store request, an 8-byte partial store request, or a data flag is supplied from CHP 8-0 or 8-1 to the control circuit 26 (FIG. 3A). The channel identification register 14 (FIG. 3B) specifies the channels. Specifically, a CHP identification number is set in the CHP upper register 14-1, while a channel identification number is set in the lower register 14-2. The +1 circuit 15 is used for initializing tag blocks 11-0 and 11-1 of tag portion 11 and data portion 12.

In FIG. 3B, comparator 16-0 compares address information read out of tag block 11-0 with address information of the CHP address register 13 so as to generate a match signal MCH0 when both types of information are matched, while comparator 16-1 compares address information read out of tag block 11-1 with address information of CHP address register 13 so as to generate a match signal MCH1 when both types of information are matched.

When MSU's 1-0 through 1-3 are accessed, address information is set in the main storage request address register 17 (FIG. 3B), and, in addition, control information such as a high priority flag, an 8-byte fetch request, a 64-byte fetch request, an 8-byte full store request, an 8-byte partial store request, or a 64-byte full store request is supplied to MSU's 1-0 through 1-3.

In FIG. 3C, the partial registers 19-1 and 19-2 of the CHB address register 19 are used for indicating the data line of data portion 12 to be accessed. The third partial register (in-line register) 19-3, which is connected to a part of the CHB address register 13 (FIG. 3A), is comprised of 3 bits for indicating an 8-byte area to be accessed within each data line.

In FIG. 3C, data to be stored from CHP 8-0 or 8-1 or data to be fetched from MSU's 1-0 through 1-3 is stored in CHB data register 20. Data to be stored, which will be transmitted from CHP 8-0 or 8-1 to MSU's 1-0 through 1-3, is set in CHP store data register 21. Data to be fetched, which will be transmitted from MSU's 1-0 through 1-3 to CHP 8-0 or 8-1, is set in CHP fetch data register 22 or 23.

The operation for a usual 8-byte data fetch request will be explained below. An 8-byte data fetch request is supplied from CHP 8-0 or 8-1 to control circuit 26 (FIG. 3A), and, in addition, address information is set in CHP address register 13 (FIG. 3B). Simultaneously, A CHP identification number and a channel identification number are set in the upper and lower registers 14-1 and 14-2, respectively, of channel identification register 14 (FIG. 3B). A read access is carried out on tag blocks 11-0 and 11-1 in accordance with the content of channel identification register 14. Next, the address information of a tag information read out of tag block 11-0 is compared with the address information (64-byte data address) of CHP address register 13. When both types of address information are consistent with each other, and, in addition, valid flag V is the logic "1", signal MCH0 becomes the logic "1". In this case, control circuit 26 reads control information CTRL including valid flag V of the corresponding tag line by a line R so as to generate control signal $C_{11}$. Simultaneously, the address information of a tag information read out of tag block 11-1 is compared with the address information of CHP address register 13 (FIG. 3B). When both types of address information are consistent with each other, and, in addition, valid flag V is the logic "1", signal MCH1 becomes the logic "1". That is, the case where either of signals MCH0 and MCH1 is the logic "1" represents consistency of address information, while the case where neither signal MCH0 or MCH1 are the logic "1" represents inconsistency of address information.

In the case of inconsistency of address information, 64-byte data including 8-byte data requested by CHP 8-0 or 8-1 is read out of MSU's 1-0 through 1-3. As a result, this 64-byte data is written into a selected data line of data portion 12 (FIG. 3C). Simultaneously, predetermined control information and address information are written into the corresponding tag line on a line W. In addition, the 8-byte data requested by CHP 8-0 or 8-1 is transmitted through CHP fetch data register 22 or 23 to CHP 8-0 or 8-1. Such selection of a data line is carried out in accordance with the following table:

TABLE

| V0 | V1 | OPERATION |
|----|----|-----------|
| 0 | 0 | Allocated to BLOCK0. |
| 0 | 1 | Allocated to BLOCK0. |
| 1 | 0 | Allocated to BLOCK1. |
| 1 | 1 | Allocated to BLOCK having flag F of "0". |

Note:
V0 and V1 are the valid flag of tag block 11-0 and 11-1, respectively, and BLOCK0 and BLOCK1 correspond to tag block 11-0 and 11-1, respectively.

As shown in the table, when valid flags V read out of tag blocks 11-0 and 11-1 (FIG. 3B) are both the logic "0", the 64-byte data read out of MSU's 1-0 through 1-3 is written on the side of tag block 11-0, that is, in the corresponding data line of the upper portion of data portion 12 (Fig. 3C). Simultaneously, predetermined control information is written into area CTRL of the corresponding tag line of tag block 11-0. In this case, valid flag V is changed from the logic "0" to the logic "1", and first-in first-out flag F is changed from the logic "0" to the logic "1". In addition, new address information is written into area ADDR of the corresponding tag line of tag block 11-0. After that, the 8-byte fetch data requested by CHP 8-0 or 8-1 is transmitted thereto.

In the case where valid flag V read out of tag block 11-0 (FIG. 3B) is the logic "0" and valid flag V read out of tag block 11-1 is the logic "1", the address of the 64-byte data read out of MSU's 1-0 through 1-3 is also written on the side of tag block 11-0, that is, in the corresponding data line of the upper portion of data portion 12 (FIG. 3C). Simultaneously, predetermined control information is written into area CTRL of each corresponding tag line of tag blocks 11-0 and 11-1. In this case, in area CTRL of the corresponding tag line of tag block 11-0, valid flag V is changed from the logic "0" to the logic "1" and first-in first-out flag F is changed from the logic "0" to the logic "1". In area CTRL of the corresponding tag line of tag block 11-1, first-in first-out flag F is changed from the logic "1" to the logic "0". In addition, new address information is written into area ADDR of the corresponding tag block of tag block 11-0. After that, the 8-byte fetch data requested by CHP 8-0 or 8-1 is transmitted thereto.

In the case where valid flag V read out of tag block 11-0 is the logic "1" and valid flag V read out of tag block 11-1 (FIG. 3B) is the logic "0", the 64-byte data read out of MSU's 1-0 through 1-3 is written on the side of tag block 11-1, that is, in the corresponding data line of the lower portion of data portion 12 (FIG. 3C). Simultaneously, predetermined control information is written into area CTRL of each corresponding tag line of tag blocks 11-0 and 11-1 (FIG. 3B). In this case, in area CTRL of the corresponding tag line of tag block 11-1, valid flag V is changed from the logic "0" to the logic "1" and first-in first-out flag F is changed from the logic "0" to the logic "1". In area CTRL of the corresponding tag line of tag block 11-0, first-in first-out flag F is changed from the logic "1" to the logic "0". In addition, new address information is written into area ADDR of the corresponding tag line of tag block 11-1. After that, the 8-byte fetch data requested by CHP 8-0 or 8-1 is transmitted thereto.

In the case where valid flag V read out of tag block 11-0 and valid flag V read out of tag block 11-1 are both the logic "1", the 64-byte data read out of MSU's 1-0 through 1-3 is written into the corresponding data line for the tag block having the first-in first-out flag F of the logic "0". Simultaneously, predetermined control information is written into the corresponding tag lines. That is, in the selected tag line, first-in first-out flag F is changed from the logic "0" to the logic "1". In the nonselected tag lines, first-in first-out flag F is changed from the logic "1" to the logic "0". In addition, new address information is written into area ADDR of the selected tag line. After that, the 8-byte fetch data requested by CHP 8-0 or 8-1 is transmitted thereto. However, if change flag C of the read tag information whose flag F was the logic "0", is the logic "1" the data of the corresponding data line is moved out to MSU's 1-0 through 1-3 and valid flag V is changed from the logic "1" to the logic "0". Such a "MOVE-OUT" operation is carried out by supplying "MOVE-OUT CHP0/1" information, "MOVE-OUT CHID" information, and "MOVE-OUT BKID" information to upper register 14-1, lower register 14-2 (FIG. 3B), and first register 19-1 (FIG. 3C), respectively, so as to transmit the 64-byte data through CHP store data register 21 to MSU's 1-0 through 1-3. After that, the 64-byte data including the 8-byte data requested by CHP 8-0 or 8-1 is read out of MSU's 1-0 through 1-3 and is written into the corresponding data line. The above-mentioned operation is then performed.

When address consistency occurs and, in addition, change flag C read out of the tag block in which the address consistency occurs is the logic "0", a value for specifying this tag block which is an output value of decoder 18 (FIG. 3B), the content of channel identification register 14 and the 8-byte address information of CHP address register 13 are set in the first, second, and third partial registers 19-1, 19-2, and 19-3, respectively, of CHB address register 19, so as to read data portion 12. As a result, the read 8-byte data is transmitted through CHP fetch data register 22 or 23 to CHP 8-0 or 8-1. Next, if the 8-byte address information of CHP address register 13 (the requested data address) indicates an area in main storage overlapping a 64-byte data line or overlaps two data lines, i.e., residing across the boundary between 64 byte blocks, that is, in order to load a next 64-byte data of MSU's 1-0 through 1-3 to the nonselected data line belonging to the same channel, a prefetch is initiated.

The prefetch operation is performed by prefetch register 24 (FIG. 3B). Specifically, the 64-byte address of CHP address register 13 is supplied through +1 circuit 25 to first partial register 24-1, and the content of channel identification register 14 is set in second and third partial registers 24-2 and 24-3. Control circuit 26 has a flag register (not shown) for indicating the state of prefetch register 24 and, if prefetch is performed, the contents of register 24-1 is set in main storage request address register 17 so as to request 64-byte fetch data. In addition, the content of registers 24-2 and 24-3 is set in channel identification register 14 so as to access tag blocks 11-0 and 11-1, and, accordingly, the above-mentioned 64-byte fetch data is written through CHB data register 20 (FIG. 3C) to the data portion 12.

When address consistency occurs and, in addition, change flag C read out of the tag block in which the address consistency occurs is the logic "1", the data of the corresponding data line of data portion 12 is read out of data portion 12 and moved out through CHP store data register 21 to MSU's 1-0 through 1-3. After that, 64-byte data, including 8-byte data requested by CHP 8-0 or 8-1, is read out of MSU's 1-0 through 1-3 and is written into the corresponding data line of data portion 12. Then, the requested 8-byte data is transmitted through CHP fetch data register 22 or 23 to CHP 8-0 or 8-1. This case is rare in practice.

The operation for a usual 8-byte data store request will be explained below. An 8-byte data full store request is supplied from CHP 8-0 or 8-1 to control circuit 26 (FIG. 3A). In addition, in the same way as an 8-byte data fetch request, address information is set in CHP address register 13 (FIG. 3B). Simultaneously, a CHP identification number and a channel identification number are set in the upper and lower registers 14-1 and 14-2, respectively, of the channel identification register 14. Next, a read access is carried out on tag blocks 11-0 and 11-1 in accordance with the content of channel identification register 14. Next, the address information of a tag information read out of tag block 11-0 is compared with the address information (64-byte data address) of CHP address register 13 by comparator 16-0. When both types of address information are consistent with each other and, in addition, valid flag V is the logic "1", signal MCH0 becomes the logic "1". In this case, control circuit 26 (FIG. 3A) reads control information CTRL including valid flag V of the corresponding tag line by the line R so as to generate control signal $C_{11}$. Simultaneously, the address information of a tag information read out of tag block 11-1 (FIG. 3B) is compared with the address information of CHP address register 13. As a result, when both types of address information are consistent with each other and, in addition, valid flag V is the logic "1", signal MCH1 becomes the logic "1".

In the case of inconsistency of address information, 64-byte data including 8-byte data requested by CHP 8-0 or 8-1 is read out of MSU's 1-0 through 1-3, and, as a result, this 64-byte data is written into a selected data line of data portion 12 (FIG. 3C). Simultaneously, predetermined control information and address information are written into the corresponding tag line over line W (FIGS. 3A and 3B). In addition, the 8-byte store data requested by CHP 8-0 or 8-1 is written through CHB data register 20 (FIG. 3C) into a data line of data portion 12. Such selection of a data line is also carried out in accordance with the above-mentioned table.

After the 8-byte store data is written into the selected data line of data portion 12, change flag C of the corresponding tag line of tag block 11-0 or 11-1 is changed from the logic "0" to the logic "1". Note that 64-byte data of a data line corresponding to a tag line having change flag C of the logic "1" is not completely consistent with the corresponding content of MSU's 1-0 through 1-3. In the corresponding tag line of a nonselected tag block, if valid flag V is the logic "1" and change flag C is the logic "1", the data of the data line corresponding to this tag line is moved out to MSU 1-0 through 1-3. Such a "MOVE-OUT" operation is carried out in the same way as mentioned above. After that, valid flag V of this tag line is changed from the logic "1" to the logic "0". This means that after a channel requests the next 64-byte data store access, valid flag V of one of the two tag lines allocated to this channel is always the logic "0", which also means that a next store request is carried out without delay.

In the case of address consistency, store data is written into the data line corresponding to the tag line of the tag block in which the address consistency occurs. One of byte mark bits BM0 through BM7 is caused to be the logic "1". In addition, if change flag C is the logic "0", this flag is caused to be the logic "1".

The operation for an 8-byte data partial store request will be explained below: In general, channels 10-0 through 10-31 (FIG. 1) are connected to input/output units such as magnetic discs, magnetic tapes, and card readers. In the case of magnetic discs or magnetic tapes, a large amount of 8-byte data is sequentially stored in MSU's 1-0 through 1-3. However, the first and last data of the sequence of data may be less than 8 bytes, for example, 4 bytes. This 4-byte data is, in this case, called 8-byte partial data. In the case of card readers, such 8-byte partial data often occurs. However, as illustrated in FIG. 2, each of byte marks BM0 through BM7 indicates whether or not the entire corresponding 8-byte data is valid. Therefore, the validity of 8-byte partial data such as 4-byte data cannot be assured. As a result, 8-byte partial store data is transmitted directly to MSU's 1-0 through 1-3, not through data portion 12 of CHB 3.

FIG. 4 is a partial logic circuit diagram of control circuit 26 of FIG. 3, for explaining the operation regarding 8-byte partial store request. In FIG. 4, reference numeral 41 is an OR circuit, 42 and 43 are AND circuits, 44 is a latch circuit, and 45 is an AND circuit. When CHP 8-0 or 8-1 requests an 8-byte partial store access, the 8-byte partial store request is supplied through the AND circuit 42 or 43 to latch circuit 44. In this case, AND circuits 42 and 43 are controlled by an internal signal "CHP0 SELECT". As a result, a high priority flag and the 8-byte partial store request are transmitted to MSU's 1-0 through 1-3. In addition, when either of the signals MCH0 and MCH1 is the logic "1" so that the consistency (matching) signal TAGMCH is the logic "1" and, in addition, change flag C of the corresponding tag line is the logic "1", valid flag V of this tag line is caused to be the logic "0" to invalidate the content of the corresponding data line of data portion 12 (FIG. 3C).

Access from a channel to the MSU is carried out in the case of data indicated by a channel command word (CCW). In addition, such access is carried out in the case of fetching a channel address word (CAW), a CCW, a dynamic address transformation (DAT) table, or storing a channel status word (CSW). In this case, a CAW, CCW, or CSW is comprised of 8 bytes, and a DAT table is comprised of 4 bytes (segment table) or 2 bytes (page table). Therefore, even if 64-byte data can be prepared in each data line of data portion 12 of CHB 3, the remaining bytes are thrown away. In addition, when such access is performed for the case of the abovementioned special data, channel overruns such as command overruns often occur, thereby reducing the throughput of CHB 3. For improving this, when a channel requests an access for special data such as a CAW, a CCW, a DAT, or a CSW, MSU's 1-0 through 1-3 are directly accessed without storing data in CHB 3 and, in addition, the request has the highest priority.

Figure 5B:
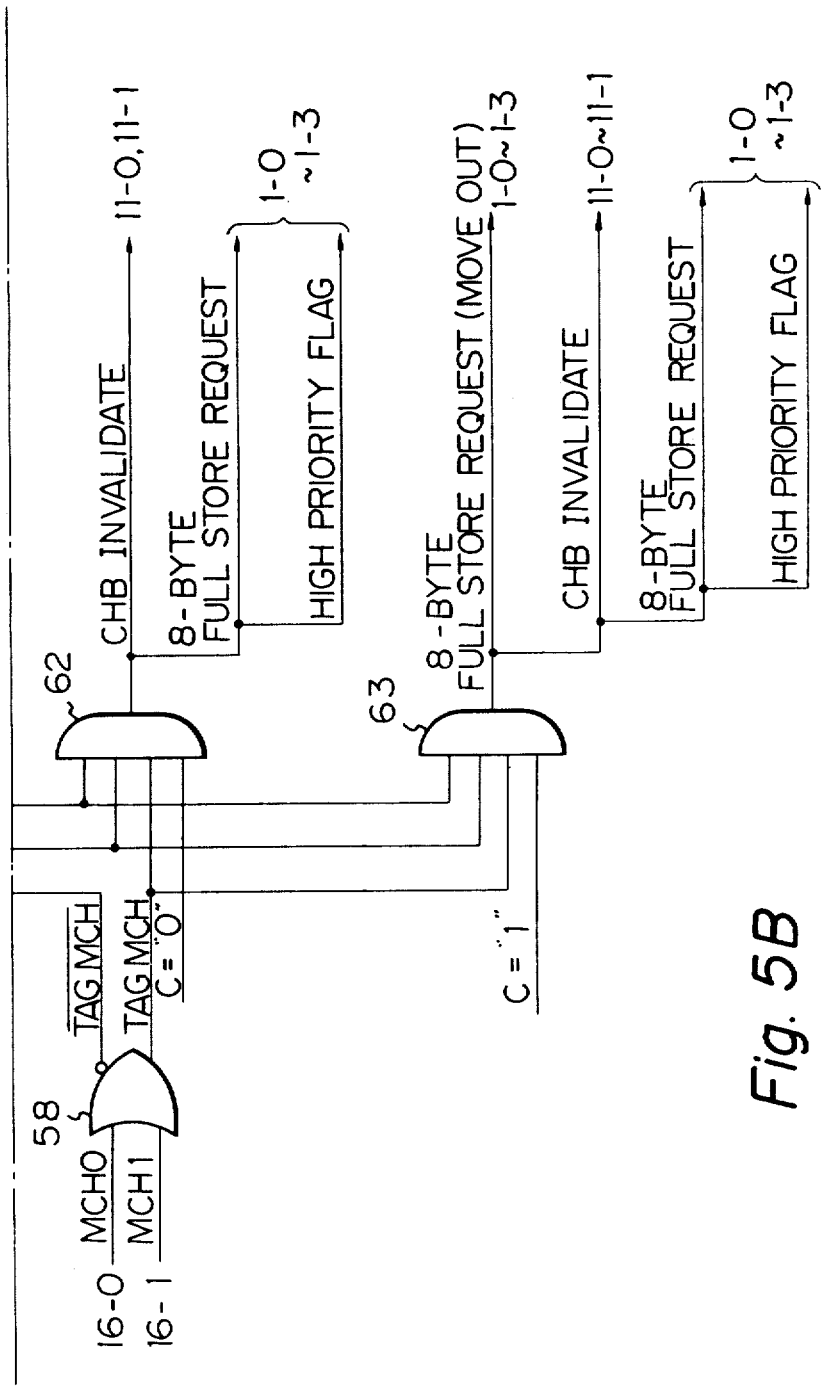
FIG. 5, comprising 5A and 5B, is a partial logic circuit diagram of the control circuit 26 of FIG. 3, for explaining the operation regarding access for special data.

FIG. 5, including FIGS. 5A and 5B, is a partial logic circuit diagram of control circuit 26 of FIG. 3, and is used for explaining the operation regarding an access for special data. In FIG. 5, reference numeral 51 (FIG. 5A) is an OR circuit, 52 through 57 are AND circuits (FIG. 5A), 58 is an OR circuit (FIG. 5B), 59 is a latch circuit, and 60 through 63 are AND circuits (FIGS. 5A and FIG. 5B). When CHP 8-0 or 8-1 (FIG. 1) requests an access for special data such as a CAW, a CCW, a DAT, or a CSW, CHP 8-0 or 8-1 generates the data flag of the logic "1" to AND circuit 52 or 53 (FIG. 5A) which are controlled by an internal signal "CHP0 SELECT". That is, the data flag is the logic "0" in the case of pure or normal data access, while the data flag is the logic "1" in the case of access for special data such as a CAW, a CCW, a DAT, or a CSW. Thus, the data flag is set in latch circuit 59 which can be a flip-flop of which the inverted output is used. If the output $\overline{\text{DATA}}$ of latch circuit 59 is the logic "1", the following control is carried out.

When a special access request represents an 8-byte data fetch, an 8-byte data fetch request and a high priority flag are transmitted from AND circuit 60 (FIG. 5A) to MSU's 1-0 through 1-3 so as to access MSU's 1-0 through 1-3. In this case, address information is transmitted from CHP address register 13 (FIG. 3B) to main storage request address register 17. When fetch data is sent from MSU's 1-0 through 1-3, it is sent directly to CHP 8-0 or 8-1 (FIG. 1) through CHB data register 20 (FIG. 3C) and CHP fetch data register 22 or 23.

When a special access request represents an 8-byte data store and the signal TAGMCH is the logic "1", an 8-byte data store request and a high priority flag are transmitted from AND circuit 61 (FIG. 5A) to MSU's 1-0 through 1-3 (FIG. 1) so as to access MSU's 1-0 through 1-3. In this case, address information is also transmitted from CHP address register 13 (FIG. 3B) to main storage request address register 17. Simultaneously, store data is transmitted from CHB data register 20 (FIG. 3C) through CHP store data register 21 to MSU's 1-0 through 1-3.

When an access request represents an 8-byte data store and the signal TAGMCH is the logic "1", and, simultaneously, change flag C of the tag line which indicates address consistency is the logic "0", the valid flag V is caused to be the logic "0" ("INVALIDATE" operation). In order to cause the valid flag V of the tag line having this change flag C to be the logic "0", the same CHP identification number and the same channel identification number are set in channel identification register 14 (FIG. 3B). After this operation for causing the valid flag V to be the logic "0", an 8-byte data store request and a high priority flag are transmitted from AND circuit 62 (FIG. 5B) to MSU's 1-0 through 1-3 (FIG. 1) so as to perform an 8-byte data storing operation.

When an access request represents an 8-byte data store and the signal TAGMCH is the logic "1" and, simultaneously, change flag C of the tag line which indicates address consistency is the logic "1", a "MOVE-OUT" operation is carried out and, after that, valid flag V is caused to be the logic "0". In addition, an 8-byte data store operation is carried out. In the "MOVE-OUT" operation, the CHP number and the channel identification number are supplied to a MOVE-OUT ID bus and are set in channel identification register 14 (FIG. 3B) so as to read tag blocks 11-0 and 11-1. As a result, the address information of the selected tag line is set in main storage access request register 17. Simultaneously, "0" or "1", which represents the tag block to which the selected tag line belongs, is set in register 19-1 (FIG. 3C), and the content of channel identification register 14 (FIG. 3B) is moved to CHB address register 19 so as to read data portion 12. The read data is set in CHP store data register 21.

Figure 6:
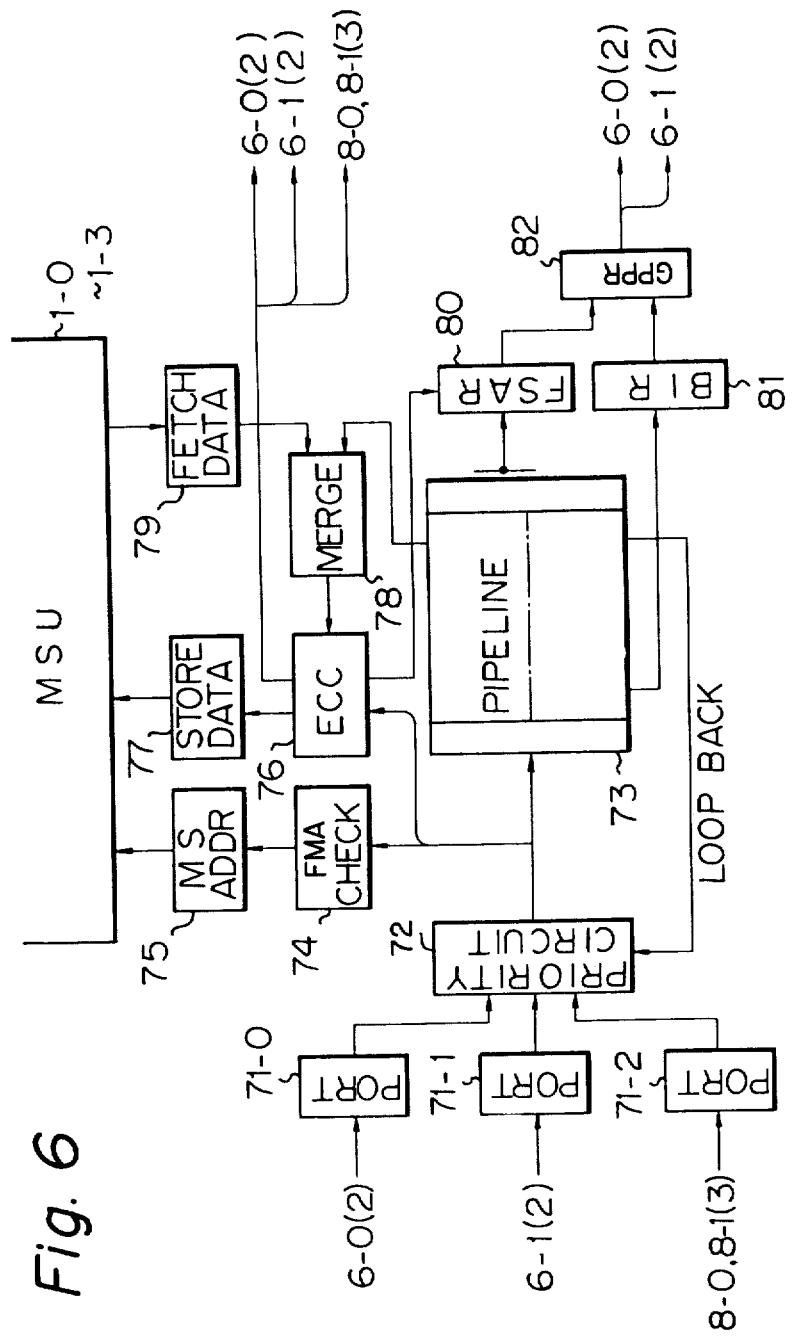
FIG. 6 is a block diagram of the access control portion for the MSU's of FIG. 1.

FIG. 6 is a block diagram of the access control portion for MSU's 1-0 through 1-3 of FIG. 1. In FIG. 6, reference numeral 71-0 is an access port allocated to CPU 6-0; 71-1 is an access port allocated to CPU 6-1; 71-2 is an access port allocated to CHP's 8-0 and 8-1 (CHB 3); 72 is a priority circuit; 73 is a control pipeline; 74 is a floating memory address (FMA) check circuit; 75 is a main storage (MS) address register; 76 is an error correction code (ECC) circuit; 77 is a store data register; 78 is a merge circuit; 79 is a fetch data register; 80 is a failing storage address register (FSAR); 81 is a buffer invalidation address register; and 82 is a general purpose path register (GPPR).

The access port 71-2 allocated to CHP's 8-0 and 8-1 comprises main storage access request register 17, CHP store data register 21, and the like of FIG. 3. The priority circuit 72 selects one access request in accordance with the priority of each access request when main storage access requests are superposed.

When a fetch request is selected, the address information of the request is transmitted through FMA check circuit 74 and MS address register 75 to MSU's 1-0 through 1-3 so as to read MSU's 1-0 through 1-3. The read data read out of MSU's 1-0 through 1-3 is transmitted through fetch data register 79 and merge circuit 78 to ECC circuit 76 which, in turn, carries out an ECC check on the data and transmits the checked data to a request source. In this case, if an ECC error is detected, the address information is transmitted through FSAR register 80 and GPPR 82 to CPU 6-0 or 6-1.

When a store request is selected, address information is transmitted through FMA check circuit 74 and MS address register 75 to MSU's 1-0 through 1-3. In addition, store data is inputted to ECC circuit 76 so as to form an ECC code. This ECC code and the store data are set in the store data register 77 and are written into MSU's 1-0 through 1-3.

When a partial store request is selected, address information is transmitted through FMA check circuit 74 and MS address register 75 to MSU's 1-0 through 1-3 so as to read MSU's 1-0 through 1-3. The read data MSU's 1-0 through 1-3 and the store data are merged by merge circuit 78 which, in turn, transmits the merged data to ECC circuit 76. As a result, an ECC code is formed for the merged data. This merged data and its ECC code are set in store data register 77. Address information is set through the loop back circuit, priority circuit 72, and FMA check circuit 74 to the MS address register 75 so as to initiate a write operation on MSU's 1-0 through 1-3.

As explained hereinbefore, the computer system according to the present invention has the following advantages:

(a) The access control is simple.

(b) No "MOVE-OUT" operation prior to the actual access operation is necessary, since after each access operation, valid flag V of either of the tag lines allocated to one channel is always caused to be the logic "0".

(c) No "RELEASE" OPERATION is necessary when an input/output instruction is initiated and when an interruption is generated at the end of data transmission, since a plurality of "MOVE-OUT" operations are performed instead of such "RELEASE" operation.

(d) Since a plurality of tag lines such as two tag lines and their corresponding data lines are allocated specially for each channel, control for searching the CHB prior to the access of the CPU to the MSU's is simple.

(e) For the same reason, the control for monitoring the sequence of storing data into the CHB is simple.

We claim:

1. A computer system, comprising:

a plurality of channels each capable of producing an access address and performing data transmission;

at least one main storage unit divided into blocks; and a memory control unit, operatively connected to said channels, and said main storage unit, for controlling data transmission between said channels, said central processing unit and said main storage unit, said memory control unit including a channel buffer, operatively connected to said channels and said main storage unit, for controlling said main storage unit and said channels, said channel buffer including:

a tag memory portion divided into a plurality of tag blocks of tag lines for storing control information and address information including a main storage block address of a block of said main storage unit, a tag line from each tag block forming a tag set, and each tag set of said tag portion being assigned to one of said channels;

a data memory portion divided into a plurality of dta lines each corresponding to one of said tag lines and each data line assigned to the corresponding said channel;

first access means, operatively connected to said channels and said tag memory portion, for accessing said tag memory portion to select one tag line of each tag block of said tag memory portion;

second access means, operatively connected to said first access means and said data memory portion, for accessing said data memory portion to select one data line thereof;

third access means, operatively connected to said tag and data memory portions, said main storage unit and said channels, for accessing said main storge unit; and comparator means, operatively connected to said tag memory portion, said first access means and said second access means, for comparing the main storage block address stored in each tag line from each tag block selected by said first access means with the access address produced by said channels for said main storage unit and for generating a matching signal when both addresses match;

access to said data memory portion being carried out by said second access means when said matching signal is generated, and access to said main storage unit being carried out by said third access means when said matching signal is not generated.

2. A computer system as set forth in claim 1, wherein each of said channels is capable of producing a partial store access request, and said channel buffer further comprises fourth access means, operatively connected to said channels and said main storage unit, for directly accessing said main storage unit when one of said channels produces said partial store access request for said main storage unit.

3. A computer system as set forth in claim 1, wherein each of said channels is capable of producing an access request for special data, and said channel buffer further comprises fifth access means, operatively connected to said channels and said main storage unit, for directly accessing said main storage unit when one of said channels produces the access request for special data from said main storage unit.

4. A computer system as set forth in claim 1, wherein the data requested is stored in two blocks of said main storage unit and said tag memory portion outputs the main storage block address to said third access means and the part of the requested data at the main storage block address in one block is fetched, and said channel buffer further comprises prefetch means, operatively connected to said first and third access means and said channels, for fetching next data from the other block of said main storage unit by modifying the main storage block address in said third access means, when the requested data is stored in two blocks the data line of said data memory portion contains the fetched data and the next fetched data is stored in the next data line of said data memory portion and thereby the requested data is stored in the data line and the next data line.

5. A channel buffer of a memory control unit of a computer system including a main storage unit and a channel processing unit having a plurality of channels each having a channel ID, which generates store and fetch access requests and an access address for data requested and to be stored, said channel buffer comprising:

data storage means for storing the data for each channel received from the channel processing unit and the main storage unit;

tag storage means for storing tag information for each channel indicating whether the data is stored in said data storage means or the main storage unit, and the tag information indicating data storage in said data storage means for two different locations in said main storage;

control means, operatively connected to the channel processing unit and said tag storage mans, for generating access request control and timing signals in dependence upon the type of access request generated by the channel processing unit;

first address storage means, operatively connected to said control means and the channel processing unit, for storing the access address in dependence upon the control and timing signals;

second address storage means, operatively connected to said first address storage means, said tag storage means, the main storage unit and said control means, for storing the access address used for accessing the main storge unit in dependence upon the control and timing signals;

tag storage addressing means, operatively connected to said tag storage means and the channel processing unit, for reading out the tag information in said tag storage means in dependence upon the channel ID contents of the tag storage addressing means;

comparison means, operatively connected to said tag storage means, said first address storage means and said control means, for comparing the access address with the tag information for both locations and for generating match signals in dependence upon the comparison;

data storage address means, operatively connected to said first address storage means, said tag storage addressing means, said comparison means, said control means and said data storage means, for reading data out of said data storage means or for storing data in said data storage means in dependence upon the match signal, the contents of said tag storage addressing means and said first address means;

input data storage means, operatively connected to the channel processing unit, the main storage unit, said data storage means and said control means, for storing data from the channel processing unit and the main storage unit into said data storage means in dependence upon the control and timing signals; and output data storage means, operatively connected to said data storage means, said input data storage means, the channel processing unit, the main storage unit and said control means, for passing data read out from said data storage means or said input data storage means to the main storage unit or the channel processing unit in dependence upon the control and timing signals.

6. A channel buffer as set forth in claim 7, wherein said direct access means comprises:

a first logic circuit operatively connected to the channel processing unit;

a latch operatively connected said first logic circuit and the main storage unit; and a second logic circuit operatively connected to said latch, said comparison means and said tag storage means.

7. A channel buffer as set forth in claim 5, further comprising direct access means, operatively connected to the channel processing unit, the main storage unit, said comparison means and said tag storage means, for causing said channel buffer to directly access the main storage unit, bypassing the storage of data in said data storage means in dependence upon the type of access request.

8. A channel buffer as set forth in claim 7, wherein said first address storage means, said second address storage means, said tag storage addressing means, said data storage addressing means, said input data storage means and said output data means each comprise a selector and a register operatively connected to the selector.

9. A channel buffer as set forth in claim 8, wherein said comparison means comprises:

comparators operatively connected to said register of said first address storage means and said tag storage means; and a decoder operatively connected to said comparators and said selector of said data storage addressing means.

10. A channel buffer as set forth in claim 9, wherein said tag storage means comprises first and second tag of the memories each storing one of the tag lines associated with each channel and each connected to one of said comparators and said data storage means comprises a single memory.

* * * * *

UNITED STATES PATENT AND TRADEMARK OFFICE
CERTIFICATE OF CORRECTION

PATENT NO. : 4,453,216         Page 1 of 2

DATED : June 5, 1984

INVENTOR(S) : TAKASHI CHIBA ET AL

It is certified that error appears in the above-identified patent and that said Letters Patent is hereby corrected as shown below:

Front page, [57] ABSTRACT, line 4, after "a", insert --tag--.

Column 3, line 10, "can be" should be --are--;
line 11, "are" should be --can be--.

Column 5, line 9, ";(COMP)" should be --(COMP);--;
line 10, "MSRAR" should be --(MSRAR)--.

Column 6, line 2, "A" should be --a--.

Column 8, line 10, after "line", insert --i.e., residing across the boundary between 64 byte blocks, that is,--;
delete "or";
delete "i.e., residing across the";
line 11, delete "boundary between 64 byte blocks, that is,".

UNITED STATES PATENT AND TRADEMARK OFFICE
CERTIFICATE OF CORRECTION

PATENT NO. : 4,453,216

DATED : June 5, 1984

INVENTOR(S) : TAKASHI CHIBA ET AL

It is certified that error appears in the above-identified patent and that said Letters Patent is hereby corrected as shown below:

```
Column 12,    line 59,    "dta" should be --data--.

Column 13,    line 6,     "storge" should be --storage--;
                          delete "and";
              line 15,    after "match;", insert --and--.

Column 14,    line 4,     "mans" should be --means--.

Column 16,    line 8,     delete "of";
              line 9,     delete "the".
```

Signed and Sealed this

*Twenty-second* Day of *January 1985*

[SEAL]

*Attest:*

DONALD J. QUIGG

*Attesting Officer*    *Acting Commissioner of Patents and Trademarks*